(12) United States Patent
Edmiston

(10) Patent No.: US 8,119,759 B2
(45) Date of Patent: Feb. 21, 2012

(54) SWELLABLE SOL-GELS, METHODS OF MAKING, AND USE THEREOF

(76) Inventor: Paul L. Edmiston, Wooster, OH (US)

( * ) Notice: Subject to any disclaimer, the term of this patent is extended or adjusted under 35 U.S.C. 154(b) by 59 days.

(21) Appl. No.: 12/819,940

(22) Filed: Jun. 21, 2010

(65) Prior Publication Data

US 2010/0254856 A1 Oct. 7, 2010

Related U.S. Application Data

(62) Division of application No. 11/537,944, filed on Oct. 2, 2006, now Pat. No. 7,790,830.

(60) Provisional application No. 60/722,619, filed on Sep. 30, 2005.

(51) Int. Cl.
C08G 77/60 (2006.01)
(52) U.S. Cl. ....................................................... 528/35
(58) Field of Classification Search ..................... 528/35
See application file for complete search history.

(56) References Cited

U.S. PATENT DOCUMENTS

| | | | |
|---|---|---|---|
| 5,563,707 A | 10/1996 | Prass et al. | |
| 2002/0070168 A1 | 6/2002 | Jiang et al. | |
| 2007/0073095 A1* | 3/2007 | White et al. | 588/306 |

OTHER PUBLICATIONS

Boury et al, "Auto-Organization in Sol-Gel Type Polycondensation: A Door to the Nanosciences", *The Chemical Record* 3:120-132 (2003).
Cerveau et al., "Influence of Kinetic Parameters on the Textural and Chemical Properties of Silsesquioxane Materials Obtained by Sol-Gel Process", *J. Mater. Chem.* 9:1149-1154 (1999).
Cerveau et al., "Sol-Gel Process: Influence of the Temperature on the Textural Properties of Organosilsequioxane Materials", *J. Mater. Chem.* 10:1617-1622 (2000).
Cerveau et al., "Nanostructured Organic—Inorganic Hybrid Materials: Kinetic Control of the Texture", *Chem. Mater* 13:3373-3388 (2001).
Dave et al., "Osmoresponsive Glasses: Osmotically Triggered Volume Changes of Organosilica Sol-Gels as a Means for Controlled Release of Biomolecules", *Adv. Mater.* 18:2009-2013 (2006).
Elvira et al., "Starch-Based Biodegradable Hydrogels with Potential Biomedical Applications as Drug Delivery Systems", *Biomaterials* 23:1955-1966 (2002).
Khalid et al., "Water State Characterization, Swelling Behavior, Thermal and Mechanical Properties of Chitosan Based Networks", *European Journal Pharmaceutical Sciences* 15:425-432 (2002).
Kurumada et al., "Structure and Formation Process of Silica Microparticles and Monolithic Gels Prepared by the Sol-Gel Method", *Colloids and Surfaces A: Physicochemical and Engineering Aspects* 139:163-170 (1998).
Mehdi et al., "Synthesis of Large-Pore Ordered Mesoporous Silicas Containing Aminopropyl Groups", *New J. Chem.* 29:965-968 (2005).
Rao et al., "Thermoresponsive Glasses: Temperature-Controlled Rapid Swelling and Deswelling of Silica-Based Sol-Gels", *Adv. Mater.* 13:274-276 (2001).
Rao et al., "Smart Glasses: Molecular Programming of Rapid Dynamic Responses in Organosilica Sol-Gels", *Adv. Mater.* 14:443-447 (2002).
Rao et al., "Smart Glasses: Molecular Programming of Dynamic Responses in Organosilica Sol-Gels", *J. Sol-Gel Sci. Technol.* 26:553-560 (2003).
Reale et al., "A Fluoride-Catalyzed Sol-Gel Route to Catalytically Active Non-Ordered Mesoporous Silica Materials in the Absence of Surfactants", *J. Mater. Chem.* 15:1742-1754 (2005).
An excerpt from Chapter 2 of SAKKA, "Handbook of Sol-Gel Science and Technology *Processing, Characterization and Applications*", vol. III Applications of Sol-Gel Technology, pp. 43-53 (undated).

* cited by examiner

*Primary Examiner* — Kuo-Liang Peng
(74) *Attorney, Agent, or Firm* — Tarolli, Sundheim, Covell & Tummino LLP

(57) ABSTRACT

The present invention relates to a method of making a swellable sol-gel composition that involves the use of a bridged silane precursor. The resulting sol-gel includes residual silanols, which are derivatized with a reagent having at least one silanol-reactive group and at least one alkyl group; and the sol-gel is then dried. Sol-gels of the invention are demonstrated to swell up to about 8-10 times their original volume in the presence of a non-polar sorbate. The sol-gel compositions can be used in a sorbate-activated actuator or in a detector for non-polar sorbates. The sol-gel compositions can further be used to take up non-polar sorbates for purposes of chemical remediation, extraction from aqueous systems or vapor, and chemical sensing.

2 Claims, 8 Drawing Sheets

SWELLABLE SOL-GELS, METHODS OF MAKING, AND USE THEREOF

RELATED APPLICATIONS

This application is a divisional of U.S. patent application Ser. No. 11/537944, filed Oct. 2, 2006 now U.S. Pat. No. 7,790,830, which claims the benefit of U.S. Provisional Patent Application Ser. No. 60/722,619, filed Sep. 30, 2005, which is hereby incorporated by reference in its entirety.

The subject matter of this application was made with support from the United States Government under National Science Foundation CAREER Grant Number 0238808. The U.S. Government may have certain rights in this invention.

FIELD OF THE INVENTION

The present invention relates to swellable sol-gel compositions that swell up to about ten or more times their dried volume when placed in contact with a non-polar sorbate, methods of making the sol-gel compositions, and uses thereof.

BACKGROUND OF THE INVENTION

Polymeric materials that have the ability to swell may be useful in a variety of applications. The mechanism of swelling depends on molecular-level processes that occur that are dictated by physical and chemical properties of the materials (Escobedo et al., *Phys. Report* 318:85 (1999)).

Sol-gel synthesis is a relatively simple and versatile method to prepare organic/inorganic polymers with diverse morphologies and chemical compositions (Wright, *Sol-Gel Materials: Chemistry and Applications*, Gordon and Breach Science Publ., Amsterdam (2001)). In contrast to hydrophilic polymers prepared from biomaterials (Khalid et al., *Eur. J. Pharm. Sci.* 15:425 (2002); Elvira et al., *Biomaterials* 1955 (2002)), dried sol-gels (or zerogels) composed of polymerized alkoxysilanes generate a $SiO_2$ matrix that is characterized as inelastic and not prone to extensive swelling in solvents when fully dried. The lack of swelling is likely due to considerable condensation reactions that occur during the gelation and drying processes that crosslink the polymeric sol-gel material (Brinker et al., *Sol-Gel Science. The Physics and Chemistry of Sol-Gel Processing*, Academic Press (San Diego), Chapter 9 (1990)). Due to the inherent chemical structure of sol-gel materials, there are few reports of sol-gels that are swellable. Some sol-gel compositions have been formulated using amine-bridged silane precursors that swell in response to changes in pH (Rao et al., *J. Sol-Gel Sci. and Tech.* 26:553 (2003)) or temperature (Rao et al., *Adv. Mater.* 13:274 (2001); Rao et al., *Adv. Mater.* 14:443 (2002)) to generate "smart" materials. These amine-bridged sol-gels are only capable of very limited swelling.

Although the physical rigidity of zerogels is often viewed as a positive characteristic of these materials, there are potential applications for sol-gels that swell upon exposure to chemical agents. If the swelling is selective towards a particular type or class of chemicals, such a response could be used to generate a chemical sensor or actuator. Swellable materials may also be useful as sorbents for chemical spills, remediation technologies, and recovery technologies if the amount of swelling is substantial and at least moderately selective.

The present invention is directed to overcoming these and other deficiencies in the art.

SUMMARY OF THE INVENTION

A first aspect of the present invention relates to a method of making a swellable sol-gel composition. This method includes the steps of: providing a bridged polysiloxane sol-gel that contains residual silanols; derivatizing the residual silanols in the sol-gel with a reagent having at least one group that is reactive with the residual silanols and at least one alkyl group; and drying the sol-gel.

A second aspect of the present invention relates to a swellable sol-gel composition made according to the first aspect of the present invention. Preferred swellable sol-gel compositions of the present invention are capable of swelling in the presence of a non-polar sorbate to at least 1.5 times their original volume, more preferably at least five times their original volume, most preferably up to about eight to ten times their original volume.

A third aspect of the present invention relates to an actuator that includes a swellable sot-gel composition according to the present invention, wherein the swellable sol-gel composition is placed so as to trigger a device when it swells in response to exposure to a non-polar sorbate. According to one embodiment, the actuator includes a trigger and a swellable sol-gel that is positioned relative to the trigger so as to swell and activate the trigger upon exposure to a non-polar sorbate.

A fourth aspect of the present invention relates to a method for remediating a chemical spill that includes the step of: contacting a chemical spill that contains a non-polar sorbate with a sol-gel composition according to the present invention under conditions effective to cause the sol-gel composition to take up the non-polar sorbate, thereby remediating the chemical spill.

A fifth aspect of the present invention relates to a method for extracting of a non-polar component present in a biphasic liquid. This method includes the steps of: contacting a sol-gel composition of the present invention with a biphasic liquid that includes an aqueous component and a non-polar component under conditions effective to . allow the sol-gel composition to take up the non-polar component; and removing the sol-gel composition from the liquid, wherein said removing leaves behind the aqueous component, thereby extracting the non-polar component from the liquid.

A sixth aspect of the present invention relates to a method for removing a non-polar component from a vapor stream. This method includes the step of: contacting a vapor stream that includes a non-polar component with a sol-gel composition according to the present invention under conditions effective to cause the sol-gel composition to take up the non-polar component, thereby removing the non-polar component from the vapor stream. In addition to removal, the non-polar component can be recovered from the sol-gel, which allows recycling of both the sol-gel and the non-polar component.

A seventh aspect of the present invention relates to a detector for detecting the presence of a non-polar sorbate, the detector including: an actuator that contains a swellable sol-gel composition that swells in the presence of a non-polar sorbate; and an indicator, coupled to the actuator, that responds to a change in the actuator caused by swelling of the sol-gel composition, thereby detecting the presence of the non-polar sorbate.

An eighth aspect of the present invention relates to a method of detecting the presence of a non-polar sorbate in a sample. This method includes the steps of: introducing a sample to a detector according to the seventh aspect of the present invention under conditions effective to allow any non-polar sorbate in the sample to contact the swellable sol-gel composition; and then determining whether the indicator identifies presence of the non-polar sorbate in the sample.

The present invention demonstrates a method for preparing swellable sol-gel materials that, after drying, are capable of swelling up to about eight to ten times their dried volume in a matter of seconds upon exposure to non-polar sorbates. As used herein, "swellable" is defined as an ability of the sol-gel material to swell greater than about 1.5 times its dried volume when placed in contact with a non-polar sorbate, whereas "highly swellable" is defined as an ability of the sol-gel to swell greater than about 2 to about 4 times its dried volume, more preferably greater than about 5 to about 7 times its dried volume. Several sol-gels of the present invention are capable of swelling about 50-100× more than any other partially swellable sol-gel previously known in the art (Rao et al., *J. Sol-Gel Sci. Tech.* 26:553 (2003); Rao et al., *Adv. Mater.* 13:274 (2001), each of which is hereby incorporated by reference in its entirety).

The dried sol-gels of the present invention are demonstrated as capable of taking up large amounts of non-polar sorbates from the gas-phase or aqueous solution. As used herein, "non-polar sorbate" refers to a substance that is capable of being taken up by the sol-gels of the present invention, whether by adsorption, absorption, or a combination thereof, where the sorbate is characterized by a polarity that is less than 8.7 on the Snyder Index. Improved swelling properties of the sol-gel can be achieved for non-polar sorbates having a polarity of about 8.0 or less on the Snyder Index, more preferably about 7.5 or less on the Snyder Index. Maximal swelling behavior of the sol-gel is obtainable for non-polar sorbates that have a polarity of 7.0 or less on the Snyder Index. A number of exemplary non-polar sorbates are identified in the Examples.

Because only non-polar sorbates are taken up by the sol-gel polymers of the present invention—even in biphasic mixtures of water and organic solvents—this allows for a degree of chemical selectivity and sets the material apart from biomaterials (Khalid et al., *J. Pharm. Sci.* 15, 425 (2002); Elvira et al., *Biomaterials* 23, 1955 (2002), which are hereby incorporated by reference in their entirety) or hydrogels (Peppas et al., "Mikos Preparation Methods and Structure of Hydrogels," In *Hydrogels in Medicine and Pharmacy*, Vol. 1 (Peppas, eds.), Boca Raton, Fla.: CRC Press, pp. 1-27 (1986), which is hereby incorporated by reference in its entirety) that absorb water or other polar liquids. Moreover, as described in detail in the examples, the swelling is completely reversible after removing the sorbate by evaporation or drying. There is no significant loss in the swelling behavior even after repeated use. The sol-gel products of the present invention, due to their unique properties, possess a number of potential applications including encapsulating molecules for controlled release (Langer et al., *AIChE J.* 40:2990 (2004), which is hereby incorporated by reference in its entirety)), chemical remediation of hydrophobic species from aqueous systems, and chemical sensing (Lavine et al., *Anal. Lett.* 39:1773 (2006), which is hereby incorporated by reference in its entirety).

BRIEF DESCRIPTION OF THE DRAWINGS

FIG. 5 is a series of SEM micrographs of sol-gels prepared under various conditions. The micrographs are organized in columns (1)-(4), and rows (a)-(d) as described below. Column 1: Sol-gels prepared using THF solvent and TBAF catalyst composed of (a) precursor 2; (b) precursor 3; (c) precursor 5; and (d) MTMS. Column 2: Sol-gels composed of precursor 1 prepared in THF using catalysts (a) TBAF; (b) DBN; (c) NaOH; and (d) HCl. Column 3: Sol-gel composed of precursor 1 using TBAF catalysis in solvents (a) ethanol; (b) acetonitrile; (c) acetone; and (d) 80% $CH_2Cl_2$, 20% THF. Column 4: Sol-gels prepared in THF using TBAF composed of the following concentrations of precursor 1: (a) 0.75X, 0.38 M; (b) 0.50X, 0.26 M; (c) 0.33X, 0.17 M; and (d) 0.25X, 0.13M. All SEM images were acquired under identical settings having the same scale as depicted in image 1*a*. Concentration of the precursor is 0.51 M unless otherwise indicated. Precursor structures are shown in Table 1. Sol-gels that have the ability to swell, under the criteria recited in Example 4, are indicated.

FIG. 6A shows an unswollen sol-gel (precursor 1, THF solvent, TBAF catalysis); FIG. 6B shows the same sol-gel swollen in a solution of poly(2,2,3,3,4,4,4-heptafluorobutylmethacrylate and dried to leave entrapped polymer. FIG. 6C shows the same sol-gel swollen in ethanol; and FIG. 6D shows the ethanol-swollen sol gel of FIG. 6C after critical point drying.

DETAILED DESCRIPTION OF THE INVENTION

Figure 1:
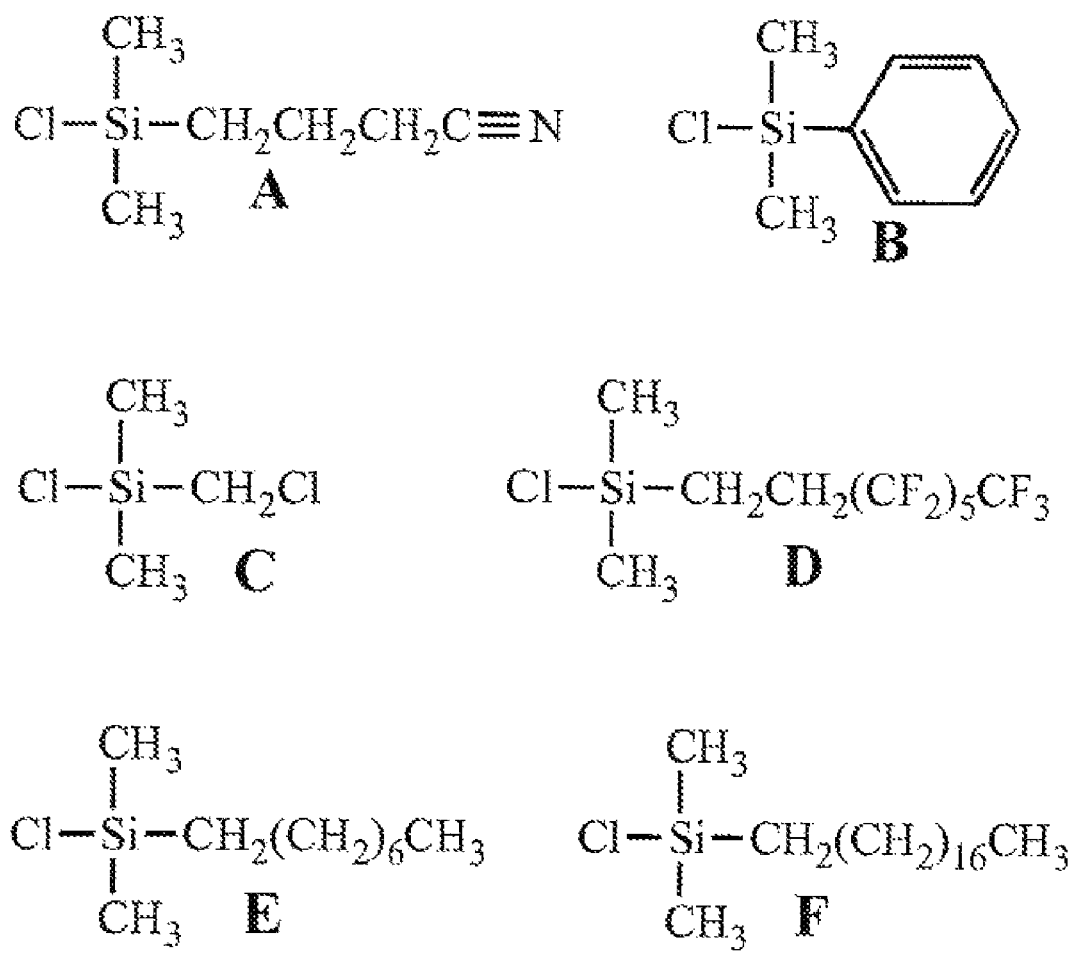
FIG. 1 illustrates exemplary chlorosilanes used to modify silanols during wet gel state: A) cynanopropyldimethyl-chlorosilane; B) phenyldimethylchlorosilane; C) chloromethyldimethylchlorosilane; D) (trideca-fluoro-1,1,2,2-tertahydro-octyl)dimethylchlorosilane; E) n-octyldimethylchlorosilane; and F) n-octadecyldimethylchlorosilane.

One aspect of the present invention relates to a method of making a swellable sol-gel composition.

Sol-gels of the present invention are prepared using one or more bridged silane precursors and well-known acid or base conditions, preferably base conditions.

The bridged silane precursors are bis(alkoxysilylalkyl) aromatics, preferably those having the structure:

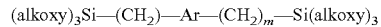

(alkoxy)$_3$Si—(CH$_2$)$_n$—Ar—(CH$_2$)$_m$—Si(alkoxy)$_3$ wherein n and m are individually an integer from 1 to 8, preferably 1 to 6, most preferably 1 to 3; Ar is an single-, fused-, or poly-aromatic ring, preferably a phenyl, biphenyl, or naphthyl; and each alkoxy is independently a C1 to C5 alkoxy, preferably C1 to C3 alkoxy.

Preferred bridged silane precursors are bis(trialkoxysilylalkyl)benzenes. Exemplary precursors include, without limitation, 1,4-bis(trimethoxysilylmethyl)benzene, bis(trimethoxysilylethyl)benzene ("BTEB"), and mixtures thereof. BTEB, in particular, is available as a mixture of stereoisomers.

The bridged silane precursor is preferably present in the reaction medium at between about 0.25M and about 1M, preferably between about 0.4M and about 0.8M, most preferably between about 0.4M and about 0.6M.

Conditions for sol-gel formation are well-known in the art, and include the use of acid or base catalysts in appropriate solvents. As demonstrated in the examples, a number of suitable conditions can be used to form the swellable sol-gel compositions.

Preferred conditions are those that contain a base catalyst in any suitable solvent. Exemplary base catalysts include, without limitation, tetrabutyl ammonium fluoride ("TBAF"), 1,5-diazabicyclo[4.3.0]non-5-ene ("DBN"), and alkylamines (e.g., propyl amine), of which TBAF is preferred. Suitable solvents for use with the base catalysts include, without limitation, tetrahydrofuran ("THF"), acetone, dichloromethane/THF mixtures containing at least 15% by vol. THF, and THF/acetonitrile mixtures containing at least 50% by vol. THF. Of these exemplary solvents, THF is preferred.

As noted above, acid catalysts can be used to form swellable sol-gels, although acid catalysts are less preferred. Exemplary acid catalysts include, without limitation, any strong acid such as hydrochloric acid, phosphoric acid, sulfuric acid, etc. Suitable solvents for use with the acid catalysts include those identified above for use with base catalysts.

After gellation, the material is preferably aged for an amount of time suitable to induce syneresis, which is the shrinkage of the gel that accompanies solvent evaporation. The aging drives off much but not necessarily all of the solvent. While aging times may vary depending upon the catalyst and solvent used to form the gel, aging is typically carried out for about 15 minutes up to about 7 days, preferably from about 1 hour up to about 4 days. Aging can be carried out at room temperature or elevated temperature (i.e., from about 18° C. up to about 60° C.), either in open atmosphere, under. reduced pressure, or in a container or oven.

Solvent and catalyst extraction (i.e., rinsing) can be carried out after or during the aging process. Preferred materials for extraction include, without limitation, any organic solvent of medium polarity, e.g., THF, acetone, ethanol, and acetonitrile, either alone or in combination.

Figure 2:
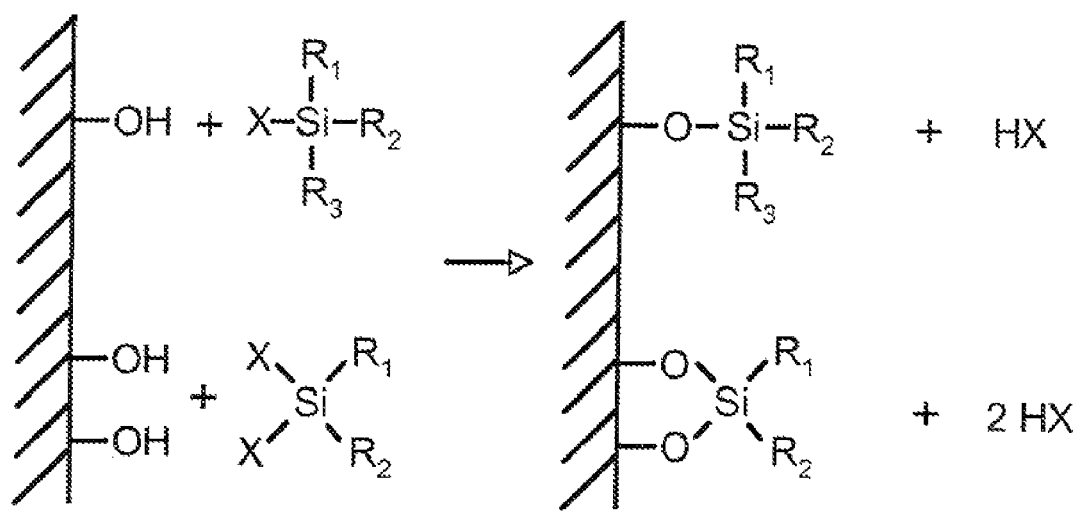
FIG. 2 shows exemplary derivatization reactions used to prepare the swellable sol-gel materials of the present invention. Silanol groups (Si—OH) on the surface of the sol-gel are reacted with silanes having either 1 or 2 silanol-reactive reactive groups, designated X, and either two or three organic groups, respectively (designated $R_1$, $R_2$, $R_3$).

After rinsing, the sol-gel is characterized by the presence of residual silanols (see FIG. 2). The silanol groups allow for derivatization of the gel using any reagent that includes both one or more silanol-reactive groups and one or more non-reactive alkyl groups. The derivatization process results in the end-capping of the silanol-terminated polymers present within the sol-gel.

One suitable class of derivatization reagents includes halosilane reagents that contain at least one halogen group and at least one alkyl group. The halogen group can be any halogen, preferably Cl, Fl, I, or Br. Preferred halosilanes or dihalosilanes include, without limitation, chlorosilanes, dichlorosilanes, fluorosilanes, difluorosilanes, bromosilanes, dibromosilanes, iodosilanes, and di-iodosilanes. Exemplary halosilanes suitable for use as derivatization reagents include, without limitation, cynanopropyldimethyl-chlorosilane, phenyldimethylchlorosilane, chloromethyldimethylchlorosilane, (trideca-fluoro-1,1,2,2-tertahydro-octyl)dimethylchlorosilane, n-octyldimethylchlorosilane, and n-octadecyldimethylchlorosilane. The structures of these exemplary reagents are shown in FIG. 1. A diagram of two exemplary derivatization reactions using these halosilane reagents is shown in FIG. 2. The alkyl groups of the reagent may be any alkyl, and the modifier may contain more than one alkyl group. The alkyl groups, as used herein, can be aliphatic or non-aliphatic hydrocarbons containing up to about 30 carbons, with or without one or more hetero atoms (e.g., S, O, N, P, halo), including straight-chain hydrocarbons, branched-chain hydrocarbons, cyclic hydrocarbons, and aromatic hydrocarbons.

Another suitable class of derivatization reagents includes silazanes or disilazanes. Any silazane with at least one reactive group X and at least one non-reactive R group (alkyl, as defined in the preceding paragraph) can be used. A preferred disilazane is hexamethyldisilazane.

After derivatizing, the derivatized gels are preferably rinsed in any of the rinsing agents described above, and then dried. Drying can be carried out under any suitable conditions, but preferably in an oven, e.g., for about 2 hr at about 60° C.

The dried sol-gel can be maintained in either a monolithic form or crushed/ground into a powdered form.

Monolithic sol-gels can be formed in any desired shape and size suitable for its planned application. This is achieved by casting the sol-gel reaction mixture in a container having a desired internal configuration and dimension, which will result in a polymerized sol-gel conforming to the desired size and shape.

For certain applications, such as remediation and recovery of non-polar sorbates (discussed hereinafter), it is desirable to utilize a sol-gel of the present invention that is in the form of a powder. Depending upon the manner in which grinding of the monolith is carried out to obtain the powdered form, the particle sizes may vary widely. Preferred powdered forms will have an average particle size that is less than about 250 µm, more preferably between about 50 to about 250 µm. Powdered forms of the sol-gel are characterized by a high surface area, which allows more rapid and effective uptake of the non-polar sorbate.

Another aspect of the present invention relates to various devices that can contain a swellable sol-gel composition of the present invention. According to one embodiment, the device can be a detector that detects the presence of a non-polar sorbate. The detector includes both an actuator that contains the swellable sol-gel composition and an indicator that is either electrically, mechanically, or optically coupled to the actuator to detect swelling of sol-gel composition.

Figure 8:
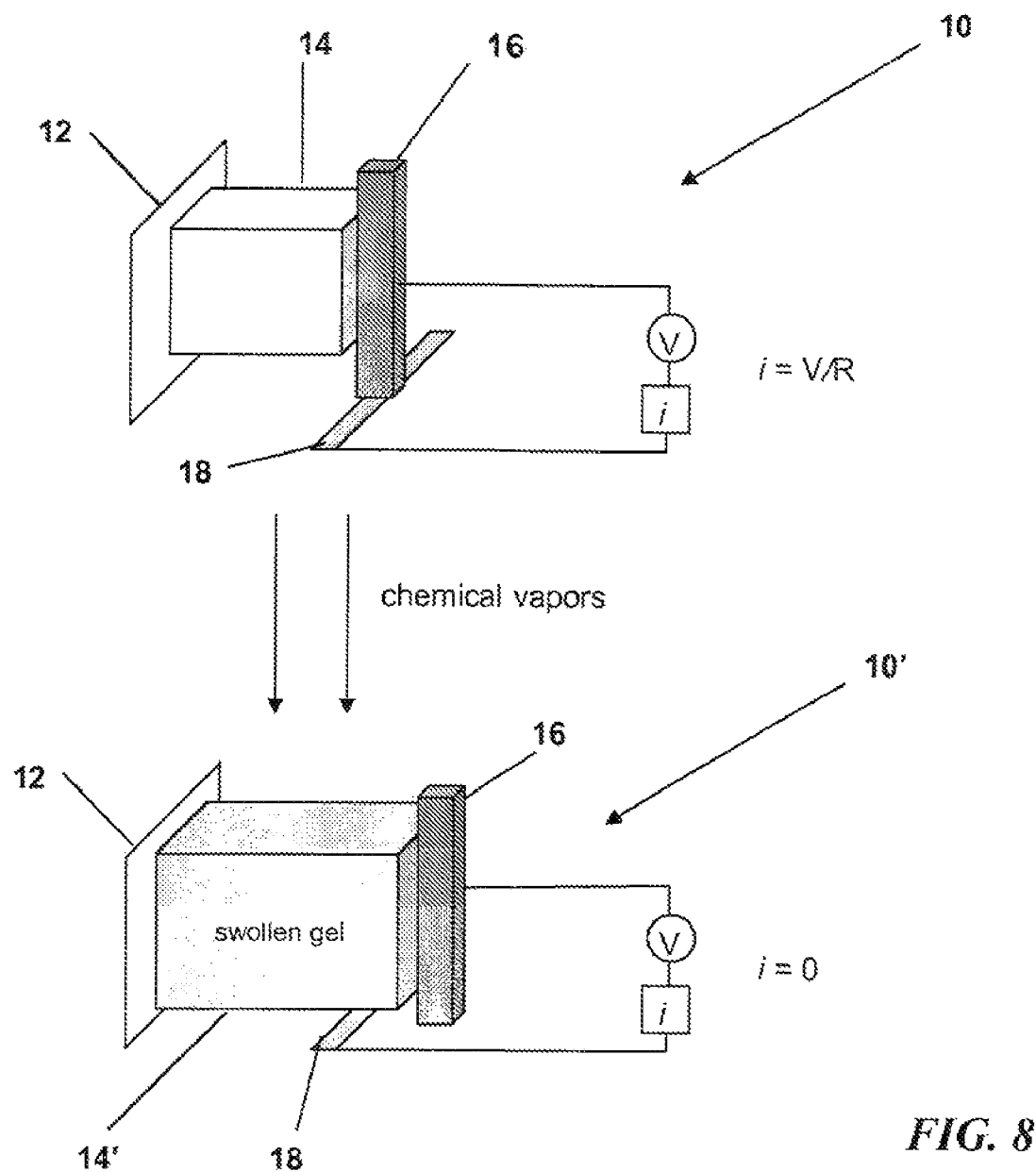
FIG. 8 is a schematic diagram of an actuator that includes a swellable sol-gel of the present invention. Prior to exposure of the sol-gel to a non-polar sorbate, the sol-gel has its smallest possible volume and electrical contact is maintained between two conductive bars to complete an electrical circuit. After exposure to the non-polar sorbate (in vapor phase), the sol-gel swells as the sorbate is taken up and, consequently, the electrical contact is broken. The presence of the sorbate can easily be detected based upon the absence of current flow through the detection circuitry.

One example of an actuator of this type is illustrated in FIG. 8. The actuator 10 includes a stationary base 12 against which the sol-gel composition 14 is placed. The sol gel composition also contacts one of a pair of electrically conductive contacts 16, 18 that are positioned to complete an electrical circuit when the sol gel is in its dried, unswollen state. The absence of a non-polar sorbate is detectable by the continued presence of current flowing through the circuit. However, upon exposure to a non-polar sorbate, either in liquid or vapor form, the sol-gel swells and displaces contact 16 from contact 18, thereby disrupting the electrical circuit. Presence of the non-polar sorbate is thus indicated by the absence of current flowing through the circuit. This can be coupled to a gated indicator circuit that detects the cessation of current flow through the circuit and illuminates, for example, an indicator light that can be observed by a user.

A sol-gel actuator has many useful applications, for example, in an alarm device or detector that is responsive to a spilled non-polar sorbate; as a check valve in a system that allows the flow of a non-polar sorbate to be shut off in response to exposure to the sorbate (i.e., liquid or vapor). Such an actuator would also be suitable in an environment where a chemically-actuated device is safer or more useful than an electronic or thermally actuated device.

According to one embodiment, a detector of the present invention can include an actuator of the type described above and an indicator, coupled to the actuator, whereby the indicator responds to a change in the actuator caused by swelling of the sol-gel composition, thereby detecting the presence of the non-polar sorbate. The indicator can be optically, electrically, or mechanically coupled to the actuator.

The present invention also relates to a method for the extraction of the components of a liquid, where the liquid contains an aqueous (or polar) component and a non-polar component (the sorbate). This method involves contacting the sol-gel composition of the present invention with the liquid to be extracted under conditions effective to allow the sol-gel composition to take up the non-polar component. The sol-gel is allowed to take up the non-polar component, swell, and is removed from the liquid. The non-polar liquid is capable of being removed with the solid phase, having been taken up by the sol-gel material. Removal of the non-polar component leaves behind the aqueous component, which can then be cleanly collected, by pouring, aspiration, evaporation, distillation, or other means known in the art, without contamination by the non-polar component. The non-polar component can be recovered, if desired, by pressure treating the sol-gel to remove the non-polar component. Upon drying of the sol gel material, the sol-gel is regenerated and available for use during further extractions.

In some embodiments, it is sufficient that the sol-gel removes essentially all the non-polar component of the liquid. If complete removal is desired, the non-polar component to be extracted is contacted with enough of the sol-gel material (to avoid complete saturation of the sol-gel) or is repeatedly contacted with fresh sol-gel until substantially complete extraction has been accomplished.

In one aspect of the present invention, the liquid extraction is carried out as described above, with the exception that the sol-gel is added to the liquid from which the non-polar component is to be extracted, removed when it has swelled to capacity with the non-polar component, pressure treated to remove the non-polar component, re-dried as described above, and re-applied to the previously treated liquid. These steps may be repeated until the non-polar component is completely extracted, and then the aqueous phase can be collected.

According to another aspect of the present invention, the sol-gel compositions can be used to remediate a chemical spill that contains a non-polar sorbate capable of being taken up by the sol-gels of the present invention. In particular, contaminated material can be water or soil, a solid surface where the non-polar sorbate has pooled or where vapor has collected. Basically, the environment containing the chemical spill of a non-polar sorbate is contacted with a sol-gel composition of the present invention under conditions effective to cause the sol-gel to take up the non-polar sorbate, thereby remediating the chemical spill.

While the sol-gel can be in a monolithic form, it is preferable for it to be present in a powdered form prior to contacting the spill environment.

As identified above, the sol-gel can be regenerated, sorbate recaptured, and the sol-gel re-used during the remediation processes. This can be achieved using the pressure extraction procedure outlined above.

Because of the selectivity of the sol-gels for non-polar sorbates, the sol-gel compositions are particularly useful for the extraction of such non-polar sorbates from both biphasic liquids and vapor streams. In either case, the biphasic liquid or vapor stream is contacted with a sol-gel composition of the present invention under conditions effective to allow the sol-gel composition to take up the non-polar sorbate. In the case of the biphasic liquids, after allowing swelling and absorption to occur (i.e., for a sufficient duration), the swollen sol-gel can be removed from the biphasic liquid, thereby extracting the sorbate from the biphasic liquid. The sorbate can then be recovered from the sol-gel using the pressure extraction procedure described above. In the case of non-polar sorbate present in vapors, the sorbate can be effectively stripped from a vapor stream and then recovered from the sol-gel using the pressure extraction procedure described above. Stripping of sorbate vapors can be important for reducing the environmental impact of ventilation systems that are used in conjunction with volatile non-polar organic solvents, such as is present manufacturing processes that involve, e.g., the spraying of paints, cleaning metal parts, industrial emissions, and dry-cleaning.

EXAMPLES

The following examples are intended to illustrate various embodiments of the claimed invention, but are not intended to limit the scope of the claims.

Materials

Bis(trimethoxysilyethyl)benzene (BTEB, shown below), chloromethyldimethylchlorosilane, n-octadecyldimethylchlorosilane, n-octyldimethylchlorosilane, phenyldimethylchlorosilane, (tridecafluoro-1,1,2,2-tertahydrooctyl)dimethylchlorosilane, 1,4-bis(trimethoxysilylmethyl)benzene, 1,4-bis(triethoxysilyl)benzene, tris(3-trimethoxysilylpropyl)isocyanurate, 1,6-bis(trimethoxysilyl)-hexane, phenyltrimethoxysilane, methyltrimethoxysilane, and tetramethoxysilane were obtained Gelest Inc., (Morrisville, Pa.). All other solvents and reagents were obtained from Sigma-Aldrich (St. Louis, Mo.). All reagents were used without further purification.

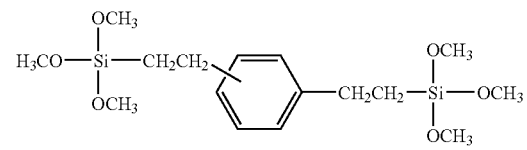

Example 1

Sol-Gel Preparation and Characterization

Sol-gels prepared by TBAF catalysis contained 27.6 mL of either tetrahydrofuran (THF) or ethanol, 6.24 mL of BTEB, 972 µL of $H_2O$, and 180 µL of 1.0 M TBAF in THF. After gelation, the materials were aged for 6 days in a closed container at 25° C. and were sequentially extracted with ethanol twice and acetonitrile twice over a 4 day period. Prior to rinsing, the gels were crushed into ~3-5 mm pieces to allow for more rapid exchange between the solvent and the gel. The sot-gels were then incubated in 20 mL of a 5% v/v solution of one of six chlorosilane reagents, as shown in FIGS. 1A-E, in acetonitrile for 48 h at room temperature. The gels were then rinsed three times with acetonitrile over 3 days and dried for 2 hr at 60° C. in a standard laboratory oven. The material was then ground in a bead mill to generate a powder.

The same general procedure was used to prepare acid catalyzed sol-gels except 375 µL of concentrated HCl was used instead of TBAF and the volume of water was increased to 3.00 mL. The gels were rinsed, derivatized with cyanopropyldimethylchlorosilane, and dried using the same procedures described above.

Surface area and pore volume were measured with a Beckman-Coulter 3100 Surface Area Analyzer using the BET method (Brunauer et al., *J. Am. Chem. Soc.* 60:309 (1938), which is hereby incorporated by reference in its entirety). Pore size distributions were measured by $N_2$ desorption using the BJH method (Barrett et al., *J. Am. Chem. Soc.* 73:373 (1951), which is hereby incorporated by reference in its entirety). Fourier transform infrared spectra were obtained by preparing KBr pellets of the dried sol-gels. Spectra were obtained using a Perkin-Elmer 2000 FT-IR at a resolution of 4 cm$^{-1}$.

Sol-gels catalyzed with TBAF gelled within 30 min of solution preparation whereas HCl catalyzed sol-gels prepared in ethanol required 4 days to gel. Materials prepared by acid catalysis in THF never completely formed a rigid gel, but exhibited sufficient cohesion to undergo rinsing and derivatization. During the aging process and rinse steps, all of the sol-gels were transparent. Syneresis of the gels prepared in THF occurred, which led to approximately 10% volume loss that stabilized after 5 days. Less syneresis was observed for HCl catalyzed sol-gels, however these gels shrunk approximately 40% during the rinsing steps. After drying, all of the sol-gels shrunk to approximately 10-20% of their initial volume, but retained their general shape. The final material was hard and could be milled to a fine powder.

FT-IR spectroscopy was performed on each TBAF/THF catalyzed sol-gel after drying. The infrared spectrum of the cyanopropyldimethylchlorosilane treated sol-gel (see FIG. 3) is similar in general terms to spectra acquired for all six types. The materials exhibit only partial hydrolysis and condensation as noted by the presence of a band at 2840 cm$^{-1}$ (—OCH$_3$) and the Si—O—C peak at 1100 cm$^{-1}$. The typical weak absorbance at 2200 cm$^{-1}$ (C≡N) and the peaks at 1400 cm$^{-1}$ (CH$_2$), and 1250 cm$^{-1}$ (Si—CH$_3$) demonstrate that a substantial amount of the chlorosilane reacted with surface silanols. However, not all the silanols were reactive as noted by the —OH peaks at 3120 cm$^{-1}$ and 3420 cm$^{-1}$. The unusually low frequency of the Si—OH band at 3120 cm$^{-1}$ suggests that the silanols are in a condensed environment interacting with neighboring groups (Richards et al., *J. Chem. Soc.* 124:1949, which is hereby incorporated by reference in its entirety) which is consistent with the fact that some silanols are inaccessible to the chlorosilane reagent during processing. The 3120 cm$^{-1}$ may also be due to strongly adsorbed water (Hench et al., *Chem. Rev.* 90:33 (1990), which is hereby incorporated by reference in its entirety).

Figure 4:
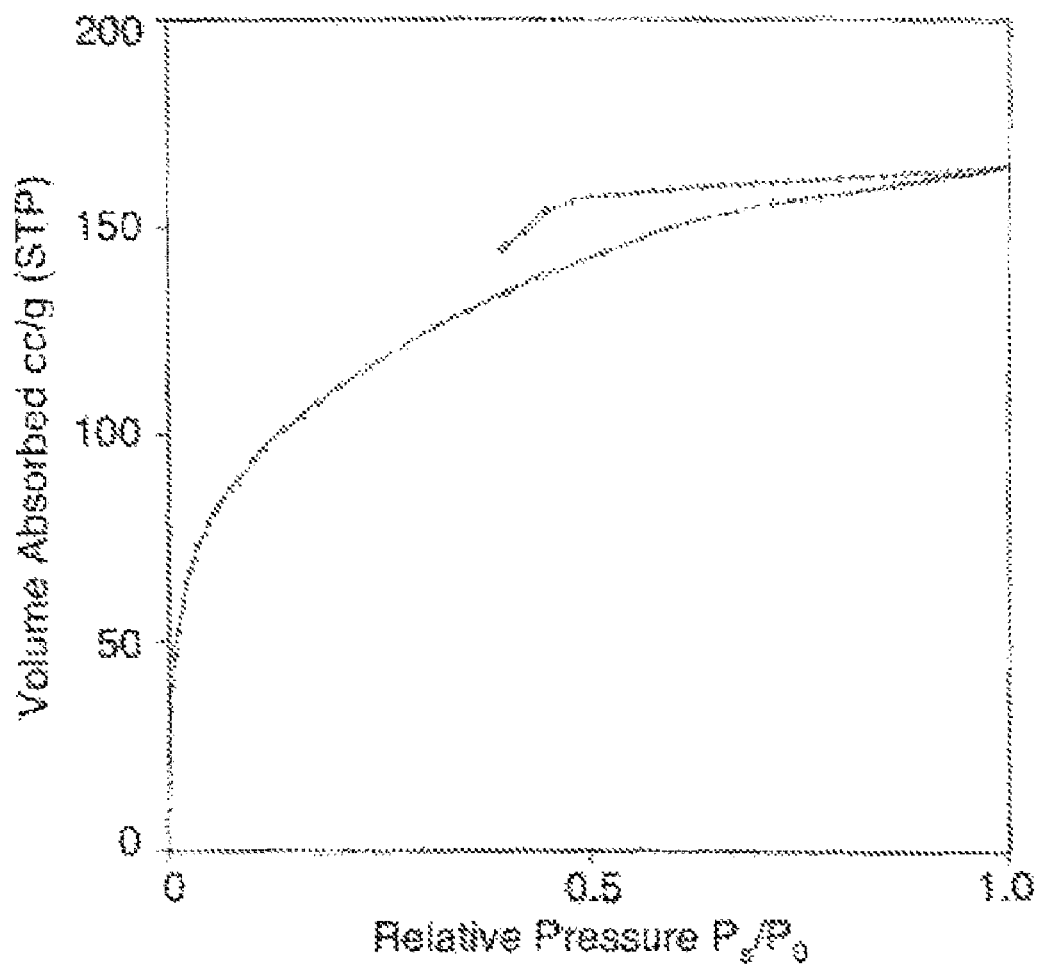
FIG. 4 is an $N_2$ adsorption and desorption isotherm of a TBAF catalyzed BTEB sol-gel derivatized with cyanopropyldimethylchlorosilane.

The surface area and pore volume of the dried TBAF/THF sol-gels were measured using $N_2$ adsorption (see Table 1, below). All of the isotherms were similar to the cyanopropyldimethylchlorosilane treated sol-gel (see FIG. 4) demonstrating Type I behavior indicative of a microporous material. The dried sol-gels exhibited relatively large total internal pore volumes except for the materials modified with alkyl groups (n-octyl and n-octadecyl).

TABLE 1

Surface Area and Pore Volume of TBAF Catalyzed Swelling Sol-Gels*

| —R group‡ | BET surface area (m$^2$/g) | Pore volume (cm$^3$/g) | Pore Size (<6 nm) |
|---|---|---|---|
| CH$_2$CH$_2$CH$_2$CN | 736 | 0.65 | 91% |
| CH$_2$Cl | 506 | 0.32 | 84% |
| n-octyl | 18 | 0.026 | 73% |
| n-octyldecyl | <10 | 0.005 | — |
| phenyl | 401 | 0.25 | 85% |
| CH$_2$CH$_2$(CF$_2$)$_5$CF$_3$ | 332 | 0.22 | 98% |

*Dried sol-gels measured by $N_2$ adsorption/desorption using the BET method. Standard error ± 5%.
‡R group of the dimethylchlorosilane used to chemically modify wet sol-gel.

Example 2

Swelling Capacity of Sol-Gels

Swelling was measured by adding sorbate (e.g., organic solvents) drop-wise to 100 mg of dried sol-gel until the first appearance of non-absorbed solvent was noted. The amount of sorbate was determined by the difference in weight. When swelling was tested in two-phase mixtures, sol-gel was added stepwise to the sorbate system.

All of the TBAF catalyzed sol-gels prepared in THF and modified with one of the chlorosilane reagents described herein above exhibited the ability to swell approximately five to seven times their initial volume when placed in an organic solvent (see Table 2, below) which returned them to their pre-dried volume. Swelling occurred nearly instantaneously when liquid was added. There is no relationship between the polarity of the organic solvent and the degree of swelling. However, none of the sol-gels swelled in water due to the fact they are hydrophobic. Also, sol-gels placed in 80:20 v/v water:methanol did not swell, although all the materials swelled in pure methanol. Sol-gels placed in 95:5 v/v water:butanol swelled, although it is unknown if butanol exclusively entered the sol-gel material. When placed in a two-phase solvent system (e.g., dichloromethane:water), the swellable sol-gels would migrate to the organic phase and swell, leaving the water exterior to the sol-gel matrix.

TABLE 2

Volume of Liquid Taken Up by TBAF Catalyzed Sol-Gels

| | Volume of solvent adsorbed (mL/g sol-gel) | | | |
|---|---|---|---|---|
| —R group | ethanol | acetonitrile | dichloromethane | hexane |
| CH$_2$CH$_2$CH$_2$CN | 7.9 | 6.8 | 6.2 | 7.9 |
| CH$_2$Cl | 6.4 | 6.2 | 7.4 | 6.4 |
| n-octyl | 6.8 | 7.3 | 6.1 | 6.8 |
| n-octyldecyl | 6.0 | 3.9 | 5.7 | 6.0 |
| phenyl | 7.2 | 6.7 | 6.5 | 7.2 |
| CH$_2$CH$_2$(CF$_2$)$_5$CF$_3$ | 6.3 | 6.8 | 6.4 | 6.3 |

Swelling is completely reversible. A material modified with n-octyldimethylchlorosilane was swelled in acetone then dried at 80° C. to ensure complete and rapid removal of the organic solvent. When placed in acetone again it swelled to the same volume. This process was repeated four more times without any loss in the degree of swelling. Thus, the elasticity of the materials is not diminished by excursions at moderately high temperatures. Solvent could also be removed by pressure. Expulsion of absorbed solvent from the sol-gel was accomplished by pressing it against an ultrafiltration membrane (PTFE membrane, pore size 0.2 μm) using air pressure. This procedure removed ~25% of the absorbed solvent at a pressure of <50 psi. Interestingly, the sol-gels could not re-swell if the solvent was removed by pressure alone. However, if the pressure-treated materials were dried they regained their normal swelling behavior.

The ability to swell is dependent on sol-gel processing conditions. When the TBAF catalyzed sol-gels are rinsed, but not derivatized prior to drying, the swelling behavior disappears. TBAF catalyzed sol-gels were rinsed and derivatized at different points during the aging period (1, 3, and 6 days) and all exhibited the same swelling behavior noted in Table 2 (above). Swelling was dependent on synthesis conditions. If ethanol was used as the solvent rather than THF during the initial formation of the gel, the resulting dried materials did not swell regardless of catalyst. Sol-gels prepared in THF using HCl catalysis swell approximately 2.5 times their initial volume. However, acid catalyzed gels prepared using 50:50 ethanol:acetonitrile, do not exhibit any swelling behavior. Thus, use of THF as a solvent during gel formation was a prerequisite for maximum swelling of the sol-gels prepared in this example. (As demonstrated in Example 4 below, other solvents also achieve swelling behavior.)

Figure 3:
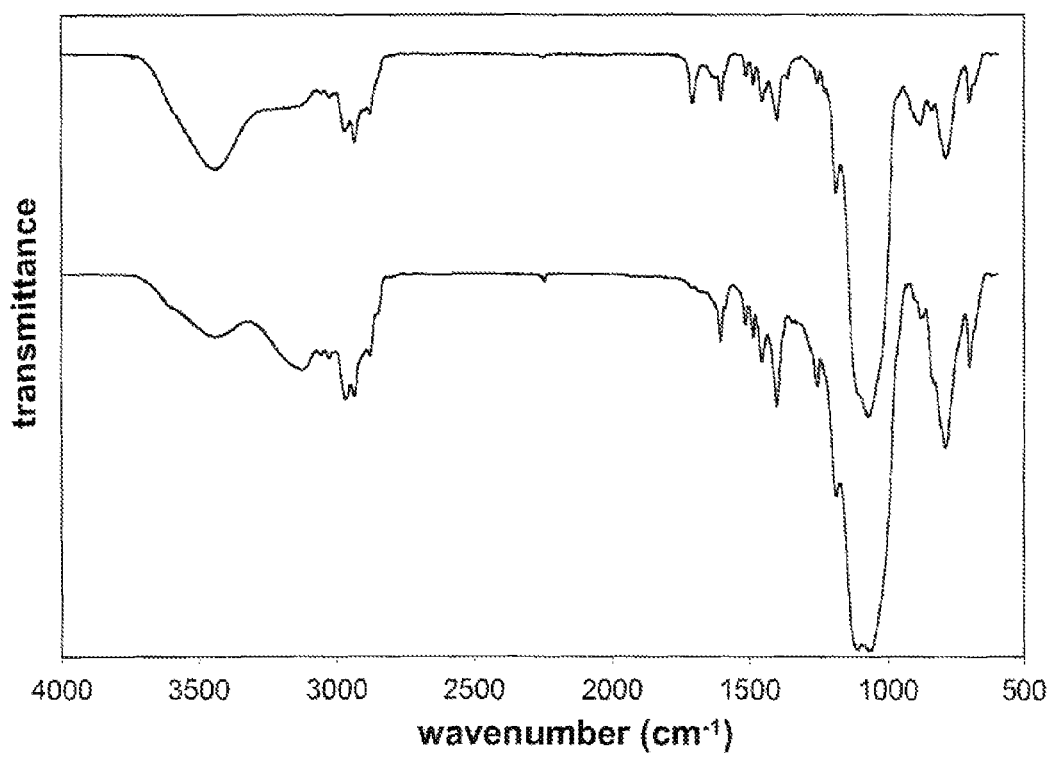
FIG. 3 is an FT-IR spectra of TBAF catalyzed BTEB sol-gels derivatized with cyanopropyl-dimethylchlorosilane using ethanol (top) or tetrahydrofuran (THF) (bottom) as a solvent.

Infrared spectroscopy was used to compare sol-gels prepared using TBAF catalysis in both THF and ethanol and derivatized with cyanopropyldimethylchlorosilane (see FIG. 3). Both gels were aged six days prior to rinsing and derivatization. The spectrum of the sol-gel prepared using ethanol indicates a greater degree of Si—O—Si bond formation by the absence of the —OCH$_3$ peak at 2840 cm$^{-1}$ and a relative increase of the Si—O—Si band at 1100 cm$^{-1}$ with a corresponding decrease in the Si—O—C band at 1050 cm$^{-1}$. Less derivatization by the chlorosilane is noted when ethanol is used (less intense peaks at 2960 cm$^{-1}$, 2200 cm$^{-1}$, 1400 cm$^{-1}$, and 1250 cm$^{-1}$).

Interestingly, a band at 1700 cm$^{-1}$ is found in the ethanol derived materials. A similar, although smaller, band is found in infrared spectrum of sol-gels catalyzed by HCl using ethanol as a solvent. The origin of the 1700 cm$^{-1}$ band is unknown. The spectrum of the TBAF/ethanol gel also shows a greater ratio of 3420 cm$^{-1}$ to 3120 cm$^{-1}$ bands in the —OH stretching region.

Example 3

Analysis of Sorbate Adsorption by Sol-Gels

Dried sol-gels (30 mg) were added to 1.00 mL solutions of methanol containing 50 ppm each of a mixture of 11 hydrocarbons (Supelco 8270 Matrix Spike Mixture) to determine if the sol-gels preferentially adsorb specific types of molecules. The sol-gels swelled and were incubated in the mixture for 48 h. The amount adsorbed was determined by measuring the amount of each molecule remaining in solution by liquid chromatography using an Agilent 1100 HPLC (4.6×150 mm Zorbax-C8 column; flow rate 1.0 mL/min; mobile phase: acetonitrile:water 20:80 ramped to 100:0 over 24 min; diode array detection) (Agilent Technologies, Palo Alto, Calif.).

Each of the TBAF/THF sol-gels prepared with various chlorosilanes were tested to determine if the surface properties were dictated by the choice of reagent used to derivatize the sol-gel during processing. This was accomplished by measuring the extent of the sorbate adsorption from an organic solvent and examining the selectively of the various materials to adsorb particular species. Each of the sol-gels was incubated in methanol solutions containing a variety of aromatic compounds of differing polarity. After incubation for 48 h, the amount of sorbate adsorbed was determined by difference using HPLC (see Table 3 below). In general, the amount of sorbate adsorbed is modest (~5×10$^{-4}$ moles/g) and, in general, is not dependent on the silane used to derivatize the sol-gel. The only difference was with the fluorinated sol-gel, which adsorbed slightly less than the other types. By comparing the amount of adsorption of polar and non-polar sorbates to the sol-gels, information about the selectivity can be determined. Two pairs of sorbates were compared: the ratio of pyrene/chlorophenol and acenapthalene/4-nitrophenol. In both instances it can be seen that the non-polar species (pyrene and acenapthalene) are adsorbed to a greater degree, however, the ratios are essentially constant throughout regardless of the derivatization agent used. The same behavior was noted when other sets of sorbate adsorptions were compared. Despite the differing derivatization reagents, no differences in adsorption properties were observed.

TABLE 3

Adsorption of Sorbates* by TBAF Catalyzed Swelling Sol-Gels

| —R group | total adsorbed (moles/g) | Selectivity† pyrene/ chlorophenol | acenapthalene/ 4-nitrophenol |
|---|---|---|---|
| CH$_2$CH$_2$CH$_2$CN | 6.0 × 10$^{-4}$ | 3.2 ± 0.4 | 1.6 ± 0.1 |
| CH$_2$Cl | 5.4 × 10$^{-4}$ | 4.0 ± 0.4 | 2.0 ± 0.2 |
| n-octyl | 5.6 × 10$^{-4}$ | 3.7 ± 1.3 | 2.0 ± 0.4 |
| n-octyldecyl | 4.0 × 10$^{-4}$ | 4.7 ± 2.0 | 6.1 ± 3.0 |
| Phenyl | 5.3 × 10$^{-4}$ | 3.9 ± 0.5 | 2.5 ± 0.9 |
| CH$_2$CH$_2$(CF$_2$)$_5$CF$_3$ | 3.8 × 10$^{-4}$ | 3.3 ± 0.6 | 2.7 ± 0.9 |

*Mixture of 11 compounds 50 ppm each in methanol: phenol, 4-nitrophenol, 2-chlorophenol, 4-chloro-3-methylphenol, pentachlorophenol, 2,4-dinitrotoluene, n-nitrosodi-n-propylamine, 1,4-dichlorobenzene, acenapthalene, 1,2,4-trichlorobenzene, and pyrene.
†Ratio of the moles absorbed.

Discussion of Examples 1-3

The properties of the sol-gel were dependent upon the choice of solvent, catalyst, or organosilane derivatizing agent. The choice of chlorosilane used to modify residual silanol groups had a notable affect on pore volume of the dried material. Silanes with alkyl groups (n-octyl and n-octadecyl) yielded materials with small pore volumes, although these sol-gels did not shrink substantially more than the other materials upon drying. The possibility that the micropores are sterically filled by the alkyl chains is not supported by the fact that the equivalently sized fluorinated sol-gel is porous. It is speculated that the alkyl chains may make sufficient van der Waals interactions to cause the collapse of the microporous structure exhibited by these materials (majority of pore diameters are <6 nm). Given that the sol-gels are elastic, pore collapse is not unrealistic. Regardless, all the TBAF catalyzed sol-gels swelled to the same degree with no correlation to the pore volume measurable in the initial dry state.

Derivatizing residual silanols to yield various surfaces may lead to preferential adsorption of chemical species based on polarity. However, diversity in the chemical functionality of the derivatization agent did not lead to significant changes in adsorption behavior (Table 3, above). The lack of specificity in adsorption may be due to the expansion of the sol-gel. When swelled, the surface properties of the expanded state may be primarily dictated by the bulk matrix composed of polymerized BTEB, rather than the derivatized silanols. Thus, all the materials may be chemically similar in terms of their surface properties.

Swelling behavior was dependent on the catalyst and solvent used for sol-gel synthesis. Fluoride ion catalysis in THF yielded the greatest degree of swelling while the same reaction carried out in ethanol produced materials that did not swell. The more highly crosslinked network and reduced derivatization observed using FT-IR for ethanol based sol-gels may explain the lack of swelling behavior of these materials. Sol-gel catalysis by fluoride ion has been proposed to take place via a penta- or hexavalent ionic intermediate (Tilgner et al., *Micropor. Mat.* 5:77 (1995); Corriu et al. (Eds.), *Ultrastructure Processing of Advanced Ceramics*, Wiley (New York), 113 (1988), each of which is hereby incorporated by reference in its entirety). Catalysis in the more polar ethanol may help stabilize the transition state leading to increased crosslinking and fewer silanol groups available for derivatization. A more crosslinked matrix may prohibit swelling. An interesting observation was that a swellable sol-gel could be produced via acid catalysis in THF, although the amount of swelling was less than half of TBAF catalyzed materials. Acid catalysis proceeds by a different mechanism favoring condensation over hydrolysis and leading to linear polymer formation. Given that swellable sol-gels are produced by both means of catalysis suggests that THF has a general effect of destabilizing ionic intermediates in catalysis or may play some other role (i.e., solvation of polymer matrix or having a lower surface tension when drying) in forming a matrix that can swell.

Preferred swellable sol-gels can be produced using a bridged polysilsesquioxane precursor via base catalysis and derivatization of silanol groups prior to drying. The molecular mechanism of swelling is not well understood as changes in co-solvent and catalyst lead to partial or complete loss of swelling behavior. Similarity in the adsorption of sorbates by all of the sol-gels prepared suggests that the surface properties of the sol-gels are quite similar, even when various chlorosilanes are used to chemically modify the gel.

Example 4

Analysis of Additional Processing Conditions that Affect Swelling

As demonstrated in Examples 1-3, the identity of the derivatizing reagent has no effect on the swelling behavior; however, derivatization is required to produce a material that swells. In this example, the number of processing variables was expanded to more fully understand the prerequisites to swellable sol-gel production.

Materials were prepared as described in the preceding examples, except as noted below. Briefly, $1.80 \times 10^{-2}$ moles of precursor and solvent to yield a final volume of 35 mL was initially mixed. Either 1804 of 1.0 M TBAF, 375 µL of conc. HCl, 90 µL of 1.0 M NaOH, 100 µL of 1,5-diazabicyclo [4.3.0]non-5-ene, or a specified amount of butylamine, was added as a catalyst. Catalyst was mixed with a stoichiometric amount of water (0.5 mol $H_2O$/mol alkoxysilane) and added to the precursor solution. After gelation, the materials were aged a prescribed time (6 days unless otherwise specified) in a closed container at 25° C. and were then sequentially extracted with ethanol twice and acetonitrile twice over a 4 day period. Prior to rinsing the gels were crushed into ~3-5 mm pieces to allow for more rapid exchange between the solvent and the gel. The sol-gels were then incubated in 20 mL of a 5% v/v solution of cyanopropyldimethylchlorosilane in acetonitrile for 48 h at room temperature. The gels were then rinsed three times with acetonitrile over 3 days and dried for 2 hr at 60° C. in a standard laboratory oven. The material was then ground in a bead mill to generate a powder.

Five variables were examined to determine the effect on swelling behavior: precursor type, precursor concentration, solvent, catalyst, and aging time (Table 4). For purposes of this example only, an objective standard for swelling (greater than five times its dried weight in less than 2 s) was used to identify those gels that swelled. Although several gels swelled to at least 1.5× their original volume, they were not identified as gels that swell within the more limited definition used in this example. Gels that did not satisfy the objective standard but showed appreciable swelling were noted. Interestingly, materials either exhibited a highly animated swelling behavior or did not swell at all (with only rare exceptions), making this type of categorization possible.

Nine different precursors were used to create sol-gels which were processed in an identical manner. These included silanes that were bridged by various organic linkages (1,2,3, 4) and silanes that contained only a single silicon center including phenyltrimethoxysilane (PTMS) and methyltrimethoxysilane (MTMS). Swellable sol-gels were only produced by materials formed from 1 or bis(trimethoxysilymethyl)benzene (2). Both are bridged silanes that contained an aromatic group that is tethered to the silicon centers via a rotationally flexible methylene or ethylene group. In contrast, 1,4-bis(triethoxysilyl)benzene (3) where the aromatic group is directly attached to the two polymerizable triethoxysilane groups docs not swell. 1,5-bis(trimethoxysilyl)hexane (5) which has a flexible bridging group but does not possess an aromatic group also does not swell.

Figure 5:
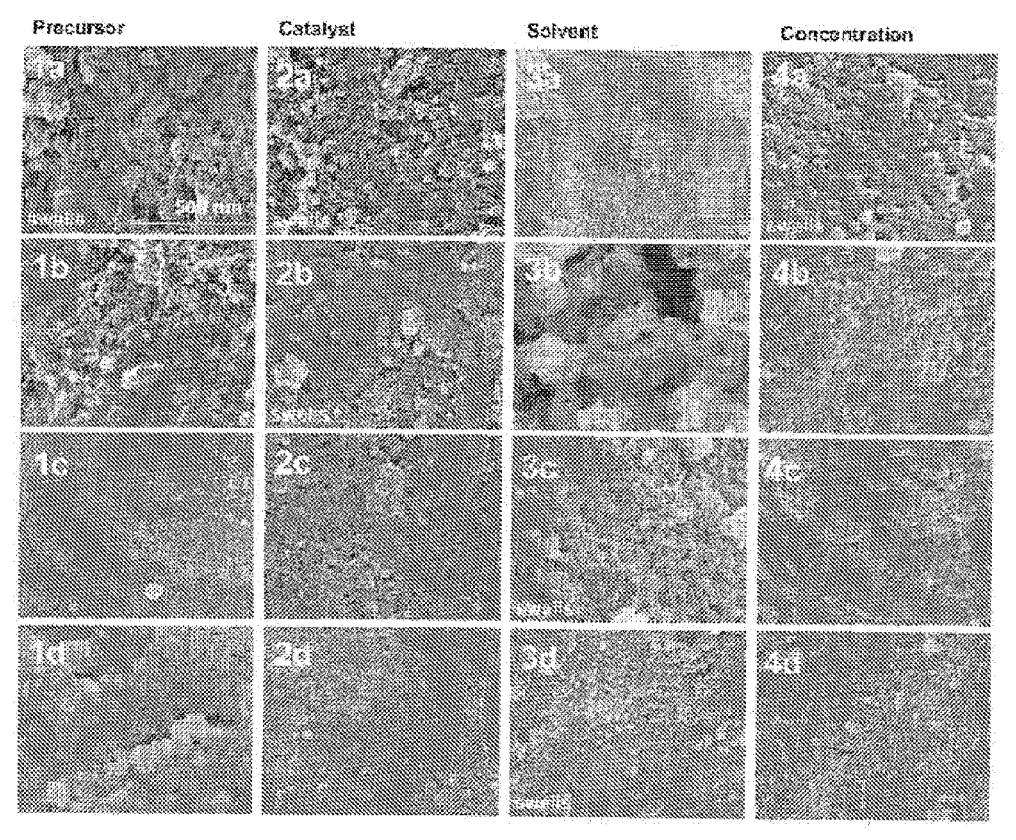

The materials composed of the bridged silanes were studied by scanning electron microscopy ("SEM") performed using a Hitachi S-4700 instrument. Solid samples were dried in a vacuum oven at 60° C. for 12 h and coated with platinum prior to measurement. Multiple areas were examined to ensure micrographs depicted were a representative of the sample. Surface area and pore volume was measured with a Beckman-Coulter 3100 Surface Area Analyzer using the BET method (Brunauer et al., *J. Am. Chem. Soc.* 60:309 (1938), which is hereby incorporated by reference in its entirety). Pore size distributions were measured by $N_2$ desorption using the BJH method (Barrett et al., *J. Am. Chem. Soc.* 73:373 (1951), which is hereby incorporated by reference in its entirety). Fourier transform infrared spectra were obtained by preparing KBr pellets of the dried sol-gels. Spectra were obtained using a Perkin-Elmer 2000 FT-IR at a resolution of 4 cm$^{-1}$. SEM images (FIG. 5: 1*a*-1*c*, 2*a*) revealed that all samples were composed of approximately 10-20 nm sized particles that are linked together into clusters of 10 or more particles. (Particle sizes were confirmed by AFM measurements.) Particles form rapidly since gelation times are on the order of 10-15 minutes and sol-gel solutions that were dried prior to gelation yielded materials that exhibit the same morphology. Regardless of precursor type, all of the sol-gels produced yield this type of microstructure consisting of interlinked nanometer-scale particles (FIG. 5: 1*a*-1*d*, 2*a*), however, the degree of clustering varies. Increased particle aggregation leads to a concomitant increase in pore volume/size and decrease in surface area as measured by $N_2$ adsorption/desorption (Table 5).

TABLE 4

Effect of Various Processing Conditions on Swelling Behavior

| Precursor* | Structure | Swelling¶ |
|---|---|---|
| 1 | 1,4-bis[2-(trimethoxysilyl)ethyl]benzene: (CH₃O)₃Si-CH₂CH₂-C₆H₄-CH₂CH₂-Si(OCH₃)₃ | Yes |
| 2 | 1,4-bis[(trimethoxysilyl)methyl]benzene: (CH₃O)₃Si-CH₂-C₆H₄-CH₂-Si(OCH₃)₃ | Yes |
| 3 | 1,4-bis(triethoxysilyl)benzene: (H₃CH₂CO)₃Si-C₆H₄-Si(OCH₂CH₃)₃ | No |
| 4 | Tris[3-(trimethoxysilyl)propyl]isocyanurate (triazine-2,4,6-trione with three N-CH₂CH₂CH₂Si(OCH₃)₃ groups) | No |
| 5 | (CH₃O)₃Si-(CH₂)₆-Si(OCH₃)₃ | No |
| PTMS | C₆H₅-Si(OCH₃)₃ | No |
| MTMS | CH₃-Si(OCH₃)₃ | No |
| TMOS | Si(OCH₃)₄ | No |
| 95% 1; 5% 2 | | Yes |

| Solvent† | Swelling |
|---|---|
| Ethanol | No |
| CH₃CN | No |
| Acetone | Yes |
| THF | Yes |
| 80% CH₂Cl₂/20% THF | Yes |
| 90% THF/10% CH₃CN | Yes |

| Catalyst§ | Swelling |
|---|---|
| HCl | Some |
| TBAF | Yes |
| NaOH | No |
| 0.05M CH₃(CH₂)₂NH₂ | No Gel |
| 0.25M CH₃(CH₂)₂NH₂ | Some |
| 0.5M CH₃(CH₂)₂NH₂ | Yes |
| DBM | Yes |

| Aging Time‡ | Swelling |
|---|---|
| None, rinsed | Slow |
| None, silane treated | No |
| 1 hr | Yes |

TABLE 4-continued

Effect of Various Processing Conditions on Swelling Behavior

|  | Swelling[¶] |
|---|---|
| 1 day | Yes |
| 3 day | Yes |
| 6 day | Yes |
| 6 day(60° C.) | Yes |
| Silane Concentration[#] | |
| 2X | No |
| 1X | Yes |
| 0.75X | Yes |
| 0.50X | Slow |
| 0.25X | No |
| 0.02X | No Gel |

*1, bis(trimethoxysilylethyl)benzene ("BTEB"); 2, 1,4-bis(trimethoxysilylmethyl)benzene; 3, 1,4-bis(triethoxysilyl)benzene; 4, tris(3-trimethoxysilylpropyl)isocyanurate; 5, 1,6-bis(trimethoxysilyl)hexane; PTMS, phenyltrimethoxysilane; MTMS, methyl trimethoxysilane; TMOS, tetramethylorthosilicate. All sol-gels were prepared using TBAF in THF, and aging for 6 days.
[¶]Swelling, as defined in this example, is greater than five times its dried weight in less than 2s.
[†]All sol-gels were prepared with 1 using TBAF catalysis and 6 day aging time.
[§]All sol-gels were prepared using 1 in THF and a 6 day aging time. The 0.05M butylamine was aged >1 month without gel formation. TBAF, tetrabutylammonium fluoride; DBN, 1,5-diazabicyclo[4.3.0]non-5-ene.
[‡]All sol-gels were prepared with 1 in THF using TBAF catalysis. For sol-gels that were not aged, one type was immediately rinsed to remove water and catalyst (rinsed) while another type was immediately treated with excess cyanopropyl-dimethylchlorosilane (silane treated). All aging was performed at 25° C. unless otherwise indicated.
[#]1X sol-gel composition is defined as 0.51 M 1 in THF prepared using TBAF catalysis. A stoichiometric amount of water was used for all types, except when <1X the amount of water was fixed at 1.54 M.

The chemical and physical properties of sol-gels prepared from bridged silanes have been extensively studied by Corriu et al. (Cerveau et al., *J. Mater. Chem.* 9, 1149 (1999); Cerveau et al., *J. Mater. Chem.* 8, 2707 (1998); Cerveau et al., *Chem. Mater.* 13, 3373 (2001), which are hereby incorporated by reference in their entirety). Zerogels composed of 1 and 3 prepared in THF using TBAF catalysis both are highly crosslinked (66% and 87%, respectively), however sol-gels prepared from 3 are more hydrophilic. Furthermore, data indicate that a significantly greater number of aromatic groups are accessible in sol-gels prepared using 1 (64%) vs. 3 (18%). These results indicate that the nanoparticles produced during polymerization have different structures depending on precursor, which in turn may lead to the differences in swelling behavior. Flexibility of the bridging component is not the sole requirement to yield a swellable material as demonstrated by sol-gels composed of 4 or 5 that do not swell. All the materials were characterized by infrared spectroscopy and have similar degrees of Si—O—Si bond formation. It is apparent that 1 and 2 yield uniquely structured particles that crosslink in a way to yield a mechanism to swell.

TABLE 5

Surface Area and Pore Volume of Various Sol-gels*

| Precursor[‡] | Solvent | Catalyst | BET Surface Area (m²/g) | Pore Volume (mL/g) | Pore Size <6 nm | Swell |
|---|---|---|---|---|---|---|
| 1 | THF | TBAF | 736 | 0.65 | 91% | Yes |
| 2 | THF | TBAF | 694 | 0.51 | 85% | Yes |
| 3 | THF | TBAF | 853 | 0.87 | 62% | No |
| MTMS | THF | TBAF | 374 | 0.40 | 49% | No |
| 1 (0.25X) | THF | TBAF | 415 | 0.35 | 40% | No |
| 1 | THF | DBN | 543 | 0.58 | 27% | Yes |
| 1 | CH₃CN | TBAF | 460 | 1.03 | 10% | No |
| 1 | acetone | TBAF | 543 | 0.57 | 91% | Yes |
| 1 | ethanol | TBAF | 3.3 | 0.18 | 25% | No |

*Dried sol-gels measured by $N_2$ adsorption/desorption using the BET method. Standard error ±5%
[‡]Structures as depicted in Table 4.

Example 5

Analysis of Swelling Dynamics

Figure 6:
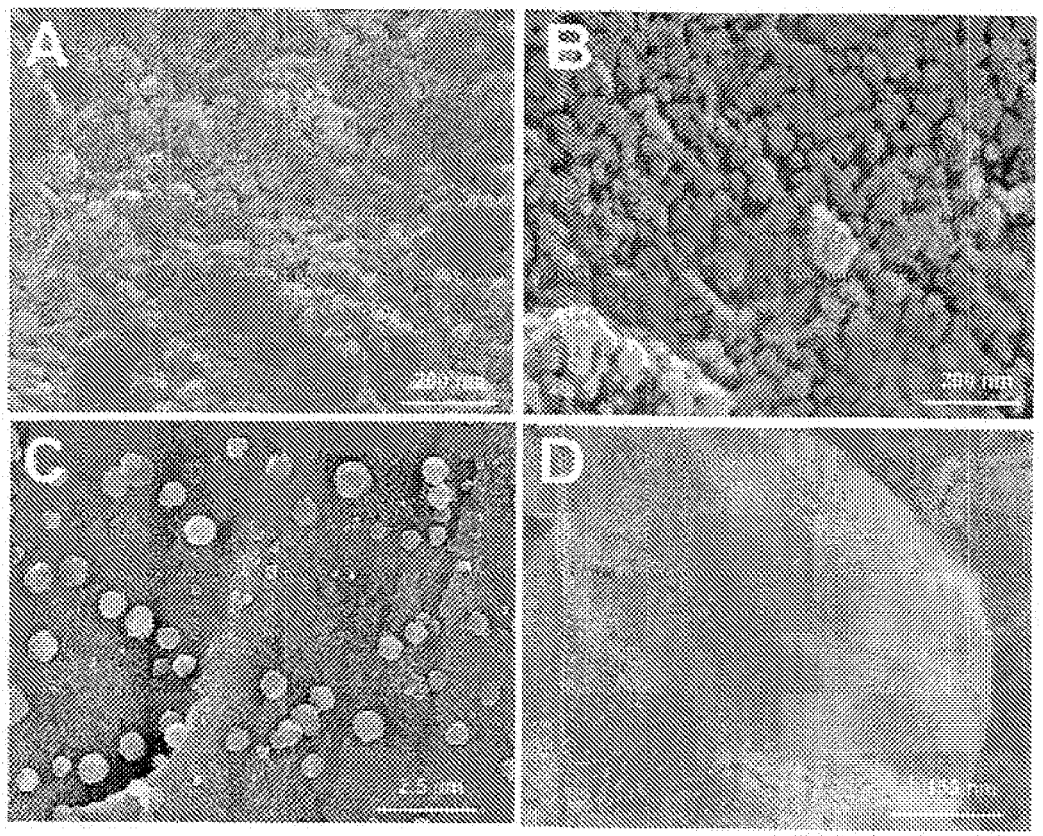
FIGS. 6A-D are SEM micrographs of unswollen and swollen sol-gels.

To understand how the sol-gel polymers swell, the morphology of the swollen state was characterized by two means: 1) critical point drying of material swollen in ethanol, and 2) swelling the sol-gel in a solution of relatively low molecular weight polymer followed by drying, thereby leaving the polymer entrapped in the matrix (FIG. 6). Swelling was measured by adding solvent drop-wise to 100 mg of dried sol-gel until the first appearance of non-absorbed solvent was noted. The amount of solvent was determined by the difference in weight. Swelling force was measured using a 3.3 cm diameter glass cylinder (inset, FIG. 7) with a course glass frit sealed to one end. The piston was loaded with a fixed weight and the volume increase was recorded after the system had come to equilibrium (<15 min). Swollen sol-gels composed of 1 (THF solvent, TBAF catalysis) were prepared for microscopy by critical point drying from ethanol using a Tousimis AUTOSAMDRI-814 apparatus or by swelling the sol-gel in a 5% w/v solution of poly(2,2,3,3,4,4,4-heptafluoro-butyl-methacrylate in acetonitrile followed by drying in at 60° C. for 24 h.

It appears that in a swellable material individual nanoparticles are tethered together in clusters, but the individual particles are flexible within the arrangement. Microscopy of swollen materials reveals that the individual clusters expand upon exposure to sorbate yielding larger spheroids. This is especially apparent in the critical point dried sol-gels (FIG. 6D) since some of this material may be in the completely expanded state which would not be the case with the polymer swelled material since the concentration of polymer used was relatively low (FIG. 6B). It is hypothesized that the open spheroids are the morphology of the gel state. During drying, the open network collapses due to surface tension of the evaporating solvent which can exceed 100 MPa (Wright et al., "Sol-Gel Materials Chemistry and Applications," Amsterdam: Gordon and Breach, p. 26 (2001), which is hereby incorporated by reference in its entirety). Normally further condensation of silanol groups would allow for crosslinking to take place that would prevent expansion after all the solvent had been removed. The derivatization of the silanol groups prior to drying prevents crosslinking. The solid matrix is assumed to be held in a "closed form" due to non-covalent interactions between collapsed hydrophobic surfaces. Upon addition of an appropriate solvent, the non-covalent interactions within the polymer matrix are disrupted and the internal tension developed during drying is released, rapidly expanding the matrix and allowing additional sorbate into the sol-gel.

Figure 7:
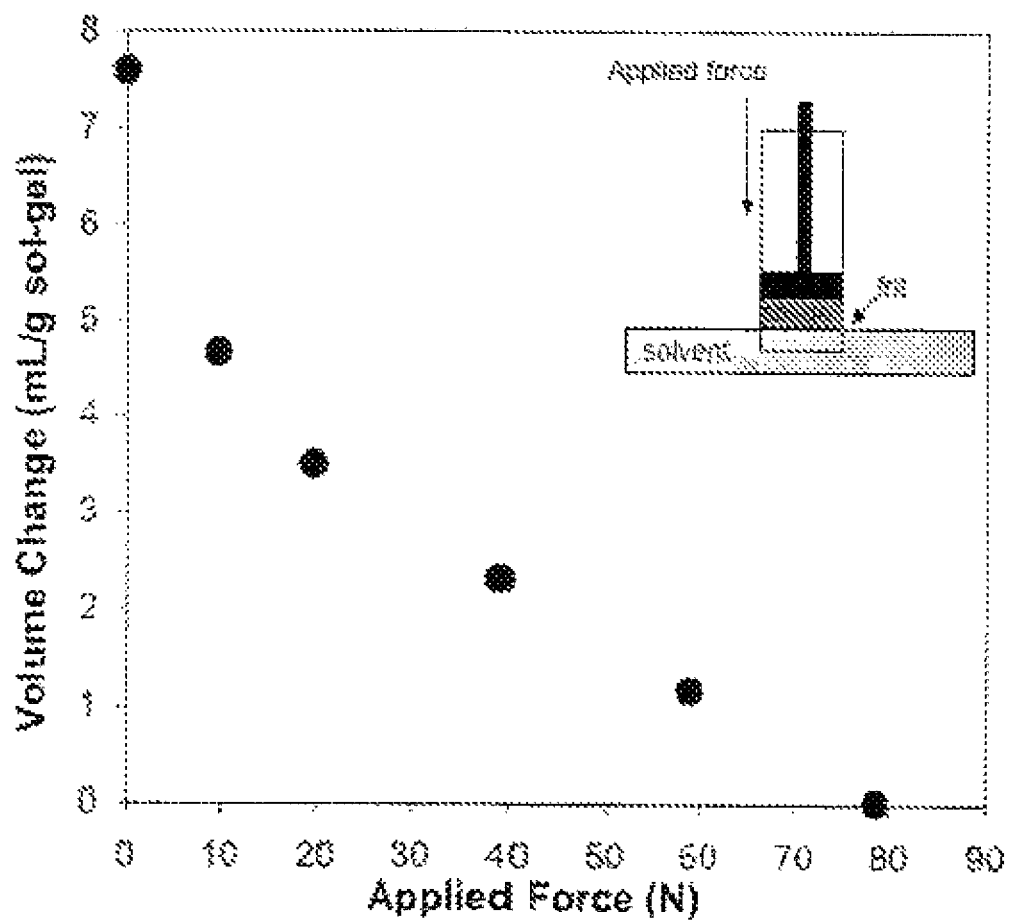
FIG. 7 is a graph that illustrates the increase in sol-gel volume upon swelling as a function of applied force. Inset: 2 g of sol-gel (precursor 1, THF solvent, TBAF catalyst) was held between a piston and a porous frit. A set amount of force was applied via the piston while the frit was immersed in ethanol to initiate swelling.

To test the force created as the dried sol-gel becomes swollen, material generated from using precursor 1 (THF solvent, TBAF catalyst) was sealed in a tube between a porous frit, where solvent could be introduced upwards by diffusion, and a piston. Weight was applied to the piston and the amount of expansion of the sol-gel upon exposure to solvent was measured (FIG. 7). The amount of force produced by swelling is considerable, for instance, 2 g of sol-gel can expand to 3× its original volume under 20 N (2 kg) of applied force. Sol-gel swelling can only be prevented by a sol-gel mass:kg force ratio of 1:8,000 or greater. This supports the theory that internal mechanical stress may be responsible for the swelling behavior. Swelling is not accompanied by changes in temperature, suggesting other thermodynamic processes such as surface solvation may not play a significant role. The fact that other sol-gels with similar morphologies do not. swell also tends to rule out solvation as a probable mechanism for swelling.

The maximum degree of solvent uptake is fairly consistent between the various formulations that swell (Table 6). The increase is generally about 6-10 times the dried volume, which is roughly equivalent to the volume lost during the initial drying of the gel to form a solid glassy material. There is no preference for sorbate as long as it is reasonably non-polar; in most cases ethanol produces approximately the same amount of volume increase as hexane. The rate of swelling is enhanced by grinding the material to a coarse powder, presumably because there is a higher surface area to volume ratio. Larger monolithic material also swells, but will typically begin to fragment as the outer portions of the polymer increase in size more rapidly, leading to stresses that produce fractures.

Two simple experiments were performed to: 1) assess the material's ability to absorb vapors, and 2) extract non-polar molecules from water. Dry sol-gel was stored in a sealed vessel that also contained a vial of acetone. After 5 days the sol-gel had increased to 1.8 times its original volume (0.55 mL acetone was adsorbed by 0.24 g of sol-gel composed of precursor 1). This indicates that vapors can be continuously extracted over a period time. In a separate set of experiments, 5 mL aliquots of homogeneous butanol/water mixtures of different concentrations were passed through a stationary bed containing 100 mg of swellable sol-gel prepared from precursor 1 using THF and TBAF. After flowing the solution past the sol-gel, the solid was blotted dry and analyzed by infrared spectroscopy to determine the identity of absorbed species. At a concentration of 1% v/v butanol, the sol-gel exclusively adsorbed the alcohol, presumably because it is non-polar and leads to matrix expansion. This property should allow the alcohol to be separated from the water. At concentrations at or above 5% v/v butanol, the sol-gel adsorbed the homogenous solution, which is attributed to the fact that the solution at this point is sufficiently non-polar to act as a swelling agent.

TABLE 6

Volume of Liquid Adsorbed by Various Sol-Gels

| Sol-Gel Processing Conditions* | Volume of solvent adsorbed (mL/g sol-gel) | | | |
|---|---|---|---|---|
| | ethanol | acetonitrile | dichloromethane | hexane |
| 1/THF/TBAF/1X/6 day | 7.9 | 6.8 | 6.2 | 7.9 |
| 1/THF/TBAF/0.75X/6 day | 9.1 | 9.7 | 9.8 | 9.5 |
| 2/THF/TBAF/1X/6 day | 9.6 | 10.6 | 9.3 | 9.7 |
| 1/acetone/TBAF/1X/6 day | 5.9 | 6.5 | 8.6 | 4.0 |
| 1/THF/DBN/1X/6 day | 3.7 | 5.9 | 6.3 | 5.6 |
| 1/THF/TBAF/1X/1 hr | 6.8 | 7.1 | 7.1 | 7.4 |

*Precursor/solvent/catalyst/relative precursor concentration/aging time

In summary, controlled sol-gel processing conditions allow for the production of a material that swells 1-2 orders of magnitude beyond any other organically modified silica material. The uptake is exclusive to non-polar species and occurs on the order of a few seconds. Electron microscopy indicates that swelling occurs by an expansion of tethered sol-gel particles that have diameters on the nanometer scale. Without being bound by belief, it is believed that the swelling is due to internal mechanical stress that is incurred upon drying and released as non-covalent interactions that hold the compressed polymer in the dry state are disrupted by sorbates.

Example 6

Recovery of Trinitrotoluene from Aqueous Solution

A ~4×25 mm bed was loaded with 150 mg sol-gel (~250 μm particles), and then water containing 500 ppm TNT was passed through the bed at a rate of 0.2 mL/min. The amount of TNT in the water was measured photometrically in real-time. It was determined that the 150 mg of sol-gel could continuously extract >95% of the toluene until the polymeric material became saturated, which occurred after 120 mL of contaminated water had passed through the bed. The amount of TNT absorbed was calculated to be about 30 mg toluene/g sol-gel (dry).

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A detector for detecting the presence of a non-polar sorbate, the detector comprising:
   an actuator that comprises a swellable sol-gel composition that swells in the presence of a non-polar sorbate; and
   an indicator, coupled to the actuator, that responds to a change in the actuator caused by swelling of the sol-gel composition, thereby detecting the presence of the non-polar sorbate.

2. The detector according to claim 1 wherein the indicator is electrically coupled to the actuator.

* * * * *